United States Patent [19]

Saxton

[11] 3,963,687

[45] June 15, 1976

[54] TWO STEP CONTINUOUS POLYMERIZATION METHOD TO FORM ACRYLONITRILE COPOLYMERS

[75] Inventor: Ronald Luther Saxton, West Grove, Pa.

[73] Assignee: E. I. Du Pont de Nemours and Company, Wilmington, Del.

[22] Filed: Jan. 2, 1975

[21] Appl. No.: 538,160

[52] U.S. Cl. ................................. 526/66; 526/71; 526/82; 526/342
[51] Int. Cl.² .................... C08F 2/16; C08F 220/44
[58] Field of Search ............... 260/85.5 R, 85.5 HC, 260/85.5 F, 85.5 P

[56] References Cited
UNITED STATES PATENTS

| | | | |
|---|---|---|---|
| 2,745,824 | 5/1956 | Melchore | 260/85.5 R |
| 2,872,438 | 2/1959 | Carroll et al. | 260/85.5 HC |
| 3,547,857 | 12/1970 | Murray | 260/85.5 R |
| 3,682,873 | 8/1972 | Hozumi et al. | 260/85.5 R |
| 3,819,762 | 6/1974 | Howe | 260/85.5 HC |

*Primary Examiner*—Alan Holler

[57] ABSTRACT

A two-vessel continuous reactor system is used to make a uniform acrylonitrile copolymer containing 65 to 85% by weight acrylonitrile polymerized units and 35 to 15% by weight of styrene polymerized units. Into a first reactor are fed a free radical initiator together with an emulsified feed containing acrylonitrile, styrene and a chain transfer agent. Formation of polymer seed particles takes place in the first reactor and an outlet stream is continuously introduced into a second reactor together with added free radical initiator and a second aqueous emulsified feed containing acrylonitrile, styrene, and a chain transfer agent to continue growth of the seed particles. Conditions of particle initiation in the first reactor as opposed to particle growth in the second reactor are carefully separated to obtain noncyclical operation with low levels of coagulum formation in both reactors together with a final low emulsifier content in the polymer.

The acrylonitrile copolymer is useful for articles where barrier properties are desirable to retard passage of oxygen, carbon dioxide and water vapor, e.g., carbonated beverage bottles.

29 Claims, No Drawings

TWO STEP CONTINUOUS POLYMERIZATION METHOD TO FORM ACRYLONITRILE COPOLYMERS

BACKGROUND OF THE INVENTION

Much work has been undertaken in recent years to develop polymers for foodstuff packaging materials which have a high degree of impermeability to passage of oxygen, carbon dioxide and water vapor. Polymeric materials for the most part have serious deficiencies where barrier properties are needed to prevent passage of oxygen, carbon dioxide and/or water vapor in comparison to a packaging material made from glass or metal. Illustratively, in the field of carbonated beverage bottles for packaging soda or beer, the ability of packaging material to minimize the migration of carbon dioxide through the walls of the bottle is absolutely essential if the package is to have the requisite shelf life.

It has been long recognized that acrylonitrile copolymers have desirable barrier properties for preventing passage of oxygen, carbon dioxide and/or water vapor. However, copolymers with high acrylonitrile content may possess undesirable processing characteristics. As the acrylonitrile content in the polymer increases to unduly high levels, the polymer becomes intractable under conventional processing conditions. The use of polymerizable monomers in conjunction with the acrylonitrile component to form a copolymer has enabled the use of conventional processing conditions in fabrication of packaging materials; for example, bottles, sheets, etc.

A teaching directed to formation of acrylonitrile copolymers is set forth in Trementozzi, U.S. Pat. No. 3,451,538 issued June 24, 1969 with utility disclosed in packaging food and medicine. Another prior art teaching is set forth in Howe, U.S. Pat. No. 3,819,762 issued June 25, 1974 whereby acrylonitrile copolymers have desirable physical and chemical properties due to uniformity in the polymer chain obtained by maintaining during polymerization a controlled ratio of acrylonitrile and a second monomer reactant. Uniformity in the polymer chain is considered to account for superior properties in the polymer.

In both of U.S. Pat. Nos. 3,451,538 and 3,819,762 described above, batch polymerization is employed to obtain the acrylonitrile polymer. As a practical matter in commercial manufacture of large quantities of polymers, continuous polymerization is desirable to reduce the cost.

Continuous polymerization techniques are well known in the art both in one or more reactor modes. A teaching disclosing continuous polymerization of acrylonitrile and styrene in a two reactor system is set forth in Murray U.S. Pat. No. 3,547,857 patented Dec. 15, 1970. This patent deals with formation of copolymers with relatively small amounts of acrylonitrile polymerized units. An earlier prior art teaching directed to a two-reactor system for emulsion polymerization is found in Carroll et al., U.S. Pat. No. 2,872,438 issued Feb. 3, 1959. Other disclosures employing the concept of polymerization using seed particles and/or two or more reactor systems include U.S. Pat. No. 2,475,016 and British Specification Nos. 1,168,760 and 1,324,955.

SUMMARY OF THE INVENTION

The present invention is directed to a continuous polymerization technique to obtain an acrylonitrile copolymer containing 65 to 85% by weight acrylonitrile polymerized units and 35 to 15% by weight styrene (or styrene derivative). Suitable copolymers include those disclosed in Howe, U.S. Pat. No. 3,819,762. The patent sets forth the essential feature of maintaining a ratio of acrylonitrile to a second monomer in the reaction medium within 25% of the ratio required to produce a polymer having an average composition throughout the molecular chain within the range of 76 to 85% by weight acrylonitrile and 24 to 15% by weight of the second monomer. The patent examples employ batch polymerization techniques which are uneconomical for commercial production.

The present disclosure covers a two-reactor system in which polymer particle initiation takes place in a first reactor and particle growth in a second reactor. Although the prior art discloses several teachings of polymerization with a two-step procedure, these teachings are deficient compared with the method disclosed herein.

For example, the teachings of Murray U.S. Pat. No. 3,547,857 of a continuous two-reactor polymerization technique are undesirable in formation of a polymer with a large proportion of acrylonitrile polymerized units from the standpoint of melt viscosity of the polymer. Melt viscosities of at least three times and greater are considered typical with the polymerization technique of U.S. Pat. No. 3,547,857 in contrast with the two reactor system of the present invention. The teachings of Carroll et al., U.S. Pat. No. 2,872,438 require a low degree of polymerization, e.g., 1 to 12% in a first reactor zone which is considered unsatisfactory for commercial applicability. The same ratio of emulsifier to monomer is fixed in both reactors and therefore relatively low emulsifier levels in the final polymer cannot be obtained.

In the present two-reactor system, the concentration of inlet components to each reactor is carefully controlled to obtain noncyclical operation with low rates of coagulum formation in the reactor vessels. The process allows the production of an acrylonitrile copolymer with relatively small amounts of emulsifier contained therein. Additionally, the process permits the use of a small concentration of an alkyl mercaptan chain transfer agent. The minimization of this chain agent is important for high acrylonitrile copolymers particularly from the standpoint of food-packaging utility due to regulations of the Food and Drug Administration, e.g., see the Federal Register, Vol. 39, No. 213, Nov. 4, 1974, pages 38895 and 38896.

In the present process a free radical initiator and an aqueous emulsified feed containing acrylonitrile, styrene, and a chain transfer agent are fed into a first reactor. By control of the monomers fed into the reactor and by control of conversion of the monomers to form the copolymer, the styrene to acrylonitrile monomer content in the reactor is maintained within 25% of the ratio required to be maintained to produce a polymer with an average compostion of 65 to 85% acrylonitrile polymerized units and correspondingly 35 to 15% styrene polymerized units. The use of the term "styrene" is understood to also mean use of styrene derivatives. Although it is most preferable to continuously maintain the stated ratio throughout this reaction, satisfactory polymer is produced if the control within this limit is maintained 95% of the reaction time.

The relative amounts of feed materials into the first reactor are governed by the content of the outlet stream continuously withdrawn from the first reactor and the degree of conversion of acrylonitrile into polymer. Specifically, the outlet stream will contain a polymer solids content of 15 to 20% by weight and preferably 16 to 19%, an emulsifier level of 4 to 7% by weight of the polymer solids and preferably 5 to 6%, and unreacted acrylonitrile of 45 to 60% by weight based on the inlet acrylonitrile feed to the first reactor and preferably 50 to 55%.

The concentration of the components in the outlet stream is maintained within the disclosed ranges to avoid undesirable results. For example, the emulsifier level is maintained at or above the minimum level of 4% since an unduly low amount will result in cycling of the polymerization rate in the first reactor with consequent undesirable variations in polymer composition. The upper limit is established by the undesirability of unduly high levels of emulsifier in the final polymer compositions. Also, too high an emulsifier concentration in the second reactor will cause particle initiation as opposed to the desired particle growth. If particle initiation begins at low emulsifier levels, cycling of reaction rate will ensue and excessive coagulum will be formed. Since all emulsifier fed to the first reactor enters the second reactor, a constraint is imposed on emulsifier concentration in the first reactor.

The outlet stream from the first reactor is continuously fed into the second reactor. In addition, a second feed stream is introduced which comprises acrylonitrile, styrene, and chain transfer agent which are emulsified in water containing a small amount of emulsifier. Additional initiator will ordinarily be required to be fed to the second reactor to achieve the desired level of monomer conversion. The relative concentration of acrylonitrile and styrene in the second reactor is maintained with the same control as in the first reactor for at least 95% of the reaction time so that copolymer within the same compositional range will be made in both reactors.

The outlet stream from the second reactor will contain a polymer solids content of 20 to 30% by weight, and preferably 23 to 27%, an emulsifier level of 1.3 to 2.5% by weight of polymer and preferably 1.6 to 2.2% and unreacted acrylonitrile of 10 to 30% based on the total acrylonitrile fed into the second reactor and preferably 15 to 25%.

Additionally, the relative amounts of the feed streams to the first and second reactors will be maintained to realize a polymer production ratio in the second to first reactor of 1:1 to 6:1 and preferably 2:1 to 5:1. The pH of the total aqueous feed streams into the first reactor as well as the second reactor (but excluding the feed from the first reactor) is desirably maintained within the range of 3 to 8 and more preferably 4 to 6. The basis of the pH range determination is a single stream identical to all inlet aqueous streams to the first reactor and a single stream identical to all inlet aqueous streams to the second reactor (but excluding the inlet feed from the first reactor).

DETAILED DESCRIPTION OF THE INVENTION

In the present two-step polymerization process a uniform acrylonitrile copolymer is formed containing acrylonitrile polymerized units in an amount of 65 to 85% by weight and styrene polymerized units present in an amount of 35 to 15% by weight. A preferred range is 73 to 82% by weight acrylonitrile polymerized units.

In the present disclosure the use of the term styrene is also inclusive of one or more of the following styrene derivatives: 4-methyl styrene; 4-(t-butyl)styrene; 3-methyl styrene; 2,4-dimethyl styrene; 2,6-dimethyl styrene and 2,4-diisopropyl styrene or $\alpha$-methyl-styrene in combination with one of the above styrenes.

As employed herein a uniform polymer denotes a polymer having the following properties: melt stability of at least 10 minutes, an inherent viscosity of 0.3 to 1.0 deciliter per gram as measured on a 0.5 gram per deciliter solution of the polymer in gammabutyrolactone at 35°C., a melt viscosity of $10^4$ to $10^6$ poises at 220°C. and a carbon dioxide permeability of less than 0.045 barrer. The polymers are inclusive of those found in Howe U.S. Pat. No. 3,819,762.

As set forth the polymer composition produced by the polymerization step disclosed herein is melt stable. The melt stability is determined by measuring continuously for a period of one hour the melt viscosity (described below) expressed as $n_o$. The curve of log $n_o$ versus time can be characterized by two quantities $S_1$ and $S_2$. These are the values of $d(\log n_o)/dt$ in the intervals 0–20 minutes and 20–60 minutes respectively. For particularly stable compositions a single value suffices for the 60-minute period. From these quantities can be calculated the value of $T_2$, the time in minutes for the melt viscosity to double ($T_2 = 41.6/S_1$). If the value of $T_2$ is much greater than 20 minutes, an average value of $S_1$ and $S_2$ can be used for $S_1$. $T_2$ is therefore a measure of melt stability. The composition will have a melt stability of at least ten minutes.

The initial melt viscosity of the polymer of the present process will be within the range of $10^4$ to $10^6$ poises at 220°C. Melt viscosity as used herein is measured with a cone and plate rheometer at a stress of $7.9 \times 10^3$ dynes per $cm^2$. The apparatus used for determining the melt viscosity is described in "Stress Relaxation After Steady Shearing: Applications and Empirical Representation" by E. Menefee in the Journal of Applied Polymer Science, Vol. 8, pp. 849–861, 1964. The initial value of viscosity is the value reported as melt viscosity, $n_o$.

The melt viscosity range as stated above is required for the composition to be processible into shaped articles, particularly beverage bottles, for the manufacture of such shaped articles is normally accomplished by extrusion-blow molding or injection-blow molding of the composition. To be most useful as far as melt processibility is concerned, the composition should have a melt viscosity of from $2 \times 0\ 10^4$ to $4 \times 10^5$ poises at 220°C.

Another limit for the composition is the inherent viscosity which is required to be of the value 0.3 to 1.0 deciliter/g. Inherent viscosity is measured on a 0.5g/deciliter solution of the polymer in $\alpha$-butyrolactone at 35°C. Inherent viscosity is defined as $\ln (n_r)/c$ where $n_r$ is the relative viscosity (flow time of solution/flow time of solvent) and $c$ is the concentration of polymer in g/dl. The inherent viscosity is determined on an Ubbelhode viscometer.

Additionally, barrier properties to passage of oxygen, carbon dioxide, and/or water vapor is an important characteristic of the present polymer. Permeability decreases as the acrylonitrile content increases in the composition. However, the carbon dioxide permeability of the polymer will be normally less than 0.045 barrer and more desirably 0.02 barrer. Carbon dioxide measurements are made following the procedure outlined in ASTM D-1434 (Method M). Permeability is expressed in barrers which have the units $$\frac{10^{-10} \text{ (cc carbon dioxide at std. temp. \& Pressure) (cm)}}{(cm^2) \quad (second) \quad (cm. mercury)}$$

Turning to the polymerization procedure in the present disclosure to make the uniform copolymer, a two-vessel reactor procedure is employed.

Into a first reactor are introduced a free radical initiator as well as an aqueous emulsified stream of acrylonitrile, styrene and a chain transfer agent. The pH of the total aqueous streams is desirably adjusted within the range of 3 to 8 and more desirably 4 to 6 by conventional techniques, e.g., addition of ammonium hydroxide. The final polymer from the two-step polymerization procedure will contain between 65% to 85% by weight acrylonitrile polymerized units and correspondingly 35 to 15% by weight styrene polymerized units. To obtain this result with the stated properties of the final polymer, at least 95% of the reaction time the styrene to acrylonitrile monomer content in the reactor is maintained within 25% of the ratio required to be maintained to produce a polymer with an average composition of 65% to 85% by weight acrylonitrile polymerized units. For illustrative purposes in the case of a styrene monomer (and excluding styrene derivatives), the ratio of styrene to acrylonitrile monomer within the reactor will be maintained in the weight ratio range of 0.0198 to 0.0330 for a polymer of 65% by weight acrylonitrile polymerized units and 0.00681 to 0.0113 for a polymer of 85% by weight acrylonitrile polymerized units. The ratios can be computed from the known reactivity ratios of 0.04 for acrylonitrile and 0.4 for styrene [F. M. Mayo and F. M. Lewis, J. Am. Chem Soc. 67, 1701 (1945)] using the equation of Skeist [J. Am. Chem. Soc. 68, 1781 (1946)]. Occasional deviations beyond the stated limits of the monomer ratio may occur without affecting the final properties of the polymer. Most desirably, the ratio of monomers in the reactor will be maintained within the stated degree of control throughout the reaction.

In a preferred embodiment of the disclosure, it is desired in producing a copolymer containing 73 to 82% by weight acrylonitrile polymerized units to maintain for at least 95% of the reaction time a monomer content in the first reactor (and also the second reactor) within 25% of the ratio required to be maintained to produce polymer with an average composition of 73 to 82% by weight acrylonitrile polymerized units.

An outlet stream continuously withdrawn from the first reactor will contain a polymer solids content of 15 to 20% by weight and preferably 16 to 19%, an emulsifier level of 4 to 7% by weight of polymer and preferably 4 to 6% and unreacted acrylonitrile of 45 to 60% by weight of the acrylonitrile fed in the reactor and preferably 50 to 55%. Also, some undecomposed free radical initiator and uncombined chain transfer agent will be present in the outlet stream from the first reactor.

From the required concentrations of components in the outlet stream of the first reactor combined with the desired degree of conversion of acrylonitrile and the desired acrylonitrile polymerized units in the polymer, it will be realized that the relative amounts of acrylonitrile, styrene, emulsifier and water fed to the reactor may be directly determined. The composition of monomer in the reactor feed that is required to produce a polymer of the desired composition can be computed from kinetic data coupled with a material balance. A simple mass balance around the reactor yields this relationship among concentrations of the two monomers in the polymer (P), in the feed (F), and in the reactor (R) where:
S = concentration of styrene
AN = concentration of acrylonitrile
subscripts F = feed  R = reactor  P = polymer $$\frac{S_P}{AN_P} = \frac{S_F - S_R}{AN_F - AN_R}$$

The fractional conversion of acrylonitrile to polymer is $$C = \frac{AN_P}{AN_F} = \frac{AN_F - AN_R}{AN_F}$$

so that $$AN_F - AN_R = C(AN_F)$$

$$AN_R = AN_F (1-C)$$

Let $$k = \frac{S_R}{AN_R},$$

the ratio of monomer concentration in the reactor at steady state
Then $S_R = k\, AN_R = k\, (AN_F)(1-C)$ $$\text{Therefore } \frac{S_P}{AN_P} = \frac{S_F - k(AN_F)(1-C)}{C(AN_F)}$$

$$= \frac{S_F}{C(AN_F)} - \frac{k(1-C)}{C}$$

$$\frac{S_F}{AN_F} = \frac{C(S_P)}{(AN_P)} + (1-C)\left(\frac{S_R}{AN_R}\right)$$

Due to the relationship between the first and second reactors, it is most convenient to describe the criticality of the cncentrations of components in the outlet rather than the inlet stream. It will be understood tht for well-mixed vessels, the composition of the outlet stream is essentially the same as that of the reactor contents.

The concentration of components in the first reactor and outlet are maintained within the disclosed ranges to obtain the desired results through the secnd reactor vessel. Variance from the disclosed ranges will lead to different results than obtained herein. For example, it is essential that the emulsifier level in the outlet stream from the first reactor be maintained within the range of 4 to 7% by weight. Unduly low levels of emulsifier result in a cycling effect in particle initiation. For the purposes of explanation only, an unduly low level of emulsifier is considered to denote that initially a sufficient amount of emulsifier may be present in the reactor for desired particle initiation in the polymerization but that the emulsifier level subsequently available for micelle formation will be decreased due to adsorption on the polymer particles so that particle initiation will slow or may cease altogether. As polymer particles are carried out of the reactor while fresh emulsifier enters the reactor, the unadsorbed emulsifier will increase to a sufficiently high concentration that micelles can form, and particle initiation will again begin. This cycling is highly undesirable due to the effect on uniformity of the final polymer composition. Also, process control of the reactors becomes difficult due to the cycling of reaction rate.

On the other hand, greatly larger quantities of emulsifier are undesirable since all the emulsifier entering the first reactor is carried into the second reactor. Excessive amounts of emulsifier cannot be tolerated in the second reactor as will be explained below.

In the first reactor a conventional average residence time to convert 40 to 50% of the inlet acrylonitrile monomer will be between 55 to 150 minutes. Reaction temperatures between 50° to 75°C. may be employed with a preferred temperature range of 65° to 70°C.

With particle formation realized in the first reactor, an outlet stream is continuously fed into the second reactor. In conjunction with this feed, a second aqueous emulsified feed stream is employed which contains acrylonitrile, styrene and a chain transfer agent. Ordinarily additional free radical initiator will also be added. The ratio of styrene to acrylonitrile monomer is maintained in the second reactor in the same ratio range as the first reactor.

High emulsifier levels which would cause particle initiation must be avoided in the second reactor. The purpose of the second reactor is to grow particles from the first reactor into a larger size in a low emulsifier environment. Additionally, high emulsifier levels are generally undesired in the final polymer composition and may directly result in increased color and haze (reduced clarity), increased extractibles and reduced melt stability.

It is essential to the success of the present invention that the acrylonitrile and styrene as well as the chain transfer agent are fed in an emulsified state to both reactors. The absence of the emulsification of the acrylonitrile, styrene and chain transfer agent to the first and second reactors will denote that the final polymer may have a melt viscosity of the order of three times or greater than can otherwise be obtained.

It is desirable that the polymer production rate of the second reactor relative to that in the first reactor be maintained in the range of 1:1 to 6:1, preferably 2:1 to 5:1. The total emulsifier concentration in the second reactor will be maintained to realize a level of emulsifier of 1.3 to 2.5% based on the weight of the final polymer in the outlet stream from the second reactor. A preferred range will be of the order of 1.6 to 2.2% by weight. Additionally, the outlet stream will have a polymer solids content of 20 to 30% by weight and preferably 23 to 27% and unreacted acrylonitrile of 10 to 30% by weight of the total acrylonitrile inflow and preferably 15 to 25%.

The concentration of emulsifier in the aqueous feed to the second reactor can be computed by simple mass balance from the quantity of emulsifier entering the first reactor, the total polymer produced in both reactors, and the desired final concentration of emulsifier based on polymer. A constraint on the quantity of emulsifier fed to the second reactor is that the amount must be sufficient to emulsify the fresh monomers and chain transfer agent. A level of 0.2–0.3% by weight of the aqueous feed has been shown to be adequate. Mechanical emulsification in water alone is not satisfactory because the melt viscosity will be higher by a factor of at least two than if at least 0.2% emulsifier by weight of water is present in the aqueous feed stream (exclusive of water from the first reactor).

A number of factors influence the selection of the best ratio of polymer production of the two reactors. Firstly, as already described, the ratio is constrained by the conflicting needs to simultaneously achieve a sufficiently low final emulsifier concentration, to maintain 4 to 7% emulsifier based on the weight of polymer in the first reactor, and to have a minimum of 0.2 to 0.3% emulsifier based on the weight of the aqueous feed to the second reactor (exclusive of water from the first reactor). These constraints operate to define an operating range of polymer production of the second reactor to the first reactor of 1:1 to 6:1 and more preferably 2:1 to 5:1. In conjunction with the preferred range of polymer production, the final emulsifier concentration is held to 2.5% or less of the total polymer produced.

The second reactor can be run at temperatures of 50° to 75°C. and preferably 65° to 70°C. Typical average residence times to convert 70 to 80% of the inflowing acrylonitrile range from 90 to 150 minutes.

As employed in the present invention an emulsifier is employed in its normal context, and will denote an amphipathic compound, exhibiting surface active properties, inter alia, reduction of interfacial tension between water and immiscible organic liquids, stabilization of colloidal dispersions of immiscible organic liquids or of organic solids in water, and formation of micelles. Conventional emulsifiers include sodium and potassium alkyl benzene sulfonates and sodium and potassium lauryl sulfates.

For synthesis of the high acrylonitrile copolymers of the present invention, the preferred emulsifier type is an aryl- or alkyl-poly(oxyethylene) ester of phosphoric acid. Monoesters can be employed, but better emulsion stability is obtained with the mixtures of mono- and diesters, for example, (p-nonylphenyl)-omega-hydroxypoly (oxyethylene)di- and monohydrogen phosphate. The latter material is marketed as Gafac RE-610 by GAF Corporation, and has an acid number of 62–72 at the first inflection point.

In addition to the emulsifier for the polymerization, a free radical initiator is necessary as is conventional in the art. Suitable initiators include inorganic persulfates, diazo compounds and organic peroxides (e.g., see Canadian Pat. No. 919,827). The preferred initiators are the inorganic persulfates, e.g., potassium persulfate, for reasons of safety and cost.

It is known that in a continuous polymerization reactor and with other conditions remaining the same, the initiator feed rate required to achieve a given degree of conversion of monomer to polymer will increase in some proportion as the total feed rate is raised. In general, the rate of increase of this initiator requirement will be greater the higher the ratio of initiator half-life to residence time in the reactor. This condition is obtained because a decreasing fraction of the feed initiator will be decomposed in the reactor as the residence time is reduced owing to an increased total flow through the reactor. Thus, the concentration of undecomposed initiator in the reactor effluent will rise at an increasing rate as total flow rate and thereby total polymer production is increased. Since removal of this initiator residue from the recovered polymer cannot be complete, the polymer will contain more initiator. Decomposition of this initiator during subsequent melt processing steps leads to undesirable side reactions, e.g., color development and instability of melt viscosity.

These factors impose a constraint on the reactor productivity that it is desirable to employ in producing the high acrylonitrile copolymers of the present invention, primarily because of the increase in yellow color that accompanies increasing productivity, and that correlates with initiator demand.

Preferred values of reactor productivity when the initiator is potassium persulfate and the reaction temperature is 65°C are discussed below. Illustratively, for the first reactor with aqueous feed pH of 6 and 17% solids, the preferred range of residence time is from 65 to 100 minutes, which corresponds to a span of reactor productivity of from 1200 to 900 lb/hr. − 1000 gal., and to initiator feed rates of 900 to 500 ppm based on polymer. With an aqueous feed pH of 4 and 17% solids, the lower end of the preferred range of residence time is shifted to 60 minutes, corresponding to a reactor productivity of 1400 lb/hr − 1000 gal., and to an initiator feed rate of about 600 ppm based on polymer. This effect is obtained because of the increased rate of decomposition of potassium persulfate at the lower pH.

For the second reactor with aqueous feed pH of 6 and 25% solids, the preferred range of residence time is from 104 to 150 minutes corresponding to a productivity range of from 700 to 570 lb/hr − 1000 gal., and to initiator feed rates of from 700 to 400 ppm based on polymer. With an aqueous feed pH of 4, the lower end of the preferred range of residence time is shifted to 98 minutes, corresponding to a productivity of 950 lb/hr. − 1000 gal., and an initiator demand of about 550 ppm based on polymer.

When the system is operated so that the overall initiator feed rate is not more than 600 ppm based on polymer, the yellowness index of the product will ordinarily be not more than 40. This yellowness index is measured on polymer (at 0.15 to 0.20% by weight water) molded at 230°C. into 0.08 inch discs (ASTM D-1925).

With persulfate initiator, there exists a narrow range of this polymer production ratio between reactors in which consumption of initiator is minimized. When the pH of the aqueous feed is adjusted to 5–6, the best ratio is considered between 2:1 to 3:1, and to be relatively independent of the relative sizes of the reactors. When the pH of the aqueous feed is reduced to 4, the minimum appears less sharp and production ratios as high as 4.5:1 have been obtained with relatively low initiator consumption. The observed effect of decreasing pH is believed to reflect reduced half life of inorganic persulfate initiators. The relationship of half life to residence time is shifted into a more favorable range at lower pH, so that the efficiency of initiator use is improved. The best ratio of polymer production is considered to lie between 2:1 and 3:1.

The use of the smallest possible amount of initiator is advantageous not only for ingredient cost considerations but because high initiator concentrations result in undesirable yellow color in the final product.

Additionally, a chain transfer agent is necessary. A desirable class of chain transfer agents are alkyl mercaptans which may be primary and secondary. Desirably, the alkyl groups will total 10 to 13 carbon atoms. Longer chain mercaptans display undesirably low chain transfer activity in acrylonitrile/styrene polymerization. Also, it appears that one function of the mercaptan is to activate inorganic persulfte initiators, and it has been observed that the use of alkyl mercaptans of more than 13 carbon atoms, e.g., n-hexadecyl mercaptan, results in more persulfate being required to effect a given conversion. Additionally, it appears that the use of longer chain mercaptans results in increased coagulum. The use of shorter chain mercaptans, e.g., n-octyl mercaptan also results in increased coagulum formation, and in increased odor of the product. The preferred chain transfer agents are n-dodecyl mercaptan or tridecyl mercaptan.

As previously discussed the minimization of alkyl mercaptan chain transfer agents is important from the standpoint of food utility due to regulations of the Food and Drug Administration. This minimization is important because alkyl mercaptans react with acrylonitrile to form relatively high boiling, water insoluble adducts. For example, with use of n-dodecyl mercaptan, the adduct formed has been found to be dodecylmercaptopropionitrile. The adducts tend to remain in the polymer, and to decompose slowly to reform the original compound. The acrylonitrile so generated can then migrate into the contents of a food or beverage package. Such adducts contribute significantly to the quantity of potentially extractible acrylonitrile in high acrylonitrile copolymer resins. The extent of the adduct-formation reaction depends on the concentration of mercaptan in the reactors, so the use of minimum feasible amounts of mercaptan to control molecular weight is desirable.

It is usually desired to make polymers of essentially equal molecular weight in the two reactors. To accomplish this, the concentration of chain transfer agents in the monomer feed must be scaled according to the extent of conversion of the monomer feed stream to polymer. In the present invention I have found empirically that setting the concentration of n-dodecylmercaptan in the feed to the first reactor (operated at 50% conversion) at 45–50% of the level in the feed to the second reactor (operated at 75–80% conversion) results in a satisfactory match in molecular weights of polymers formed in the two reactors. Also, because the rate of reaction between mercaptan and polymer chains ending in a styryl radical is greater than that for chains ending in a nitrile radical, less mercaptan is needed to achieve a given molecular weight the higher the concentration of styrene to be incorporated in the polymer.

For n-dodecyl mercaptan chain transfer agent, the ranges of concentration in the feed emulsion to the first and second reactors are listed below which concentrations result in molecular weights giving melt viscosities within the range of $10^4$ to $10^6$ poises at 220°C.

| Final Polymer Composition (weight % Acrylonitrile) | Concentration of n-dodecyl mercaptan in Feed (weight % based on total weight of all monomers) | |
|---|---|---|
| | Reactor 1 | Reactor 2 |
| 65 | 0.16–0.467 | 0.35–1.02 |
| 73 | 0.25–0.55 | 0.54–1.2 |
| 82 | 0.32–0.70 | 0.7–1.5 |
| 85 | 0.43–0.74 | 0.94–1.6 |

Also, these ranges permit obtaining a final polymer containing less than 250 ppm of dodecylmercaptopropionitrile adduct. For polymer production with 65% to 85% by weight of acrylonitrile polymerized units a feed concentration of n-dodecyl mercaptan may be expressed as a minimum value of 0.16% and a maximum value of 0.74% in the first reactor and a minimum value of 0.35% and a maximum value of 1.6% in the second reactor. These ranges permit obtaining a final polymer containing less than 250 ppm. of dodecylmercaptopropionitrile adduct.

The two-reactor system of the present invention can be operated over a wide range of pH of the aqueous feed such as from 3 to 8, and more desirably 4 to 6. Consumption of inorganic persulfate initiators, however, is less below a pH of 5. The color of the polymer becomes yellower as the pH exceeds 7. The mechanical stability of the latex, as evidenced by coagulum formation, suffers at a pH less than 4 wherein the emulsifier is of the polyoxymethylene-phosphate ester type.

An important effect of pH is that above a pH of 6, the reaction of n-alkyl mercaptans with acrylonitrile is accelerated. This leads to large residues of the alkylmercaptopropionitrile adduct in the product, with a consequent greater reservoir of potentially extractible acrylonitrile. All these factors combine to constrain the preferred operating range of aqueous feed pH to between 4.0 and 6.0.

A problem in production of high acrylonitrile copolymers by emulsion polymerization is coagulum formation. Coagulum deposits form on the reactor vessel walls and on the agitator, and steadily reduce the transport of heat from the emulsion to cooling liquid circulated in the reactor jacket. Eventually the difficulty in heat removal requires either a reduction in production rate, or a shutdown to a scrape off, or dissolve the polymer adhesions. Either alternative results in lost production time. The rate of growth of coagulum adhesions goes up with increasing reaction rate and indeed is observed to rise faster than reaction rate. Therefore, the amount of coagulum formed in a given time increases at a faster rate than the polymer production.

A feature of the present invention is that coagulum formation amounts to a small fraction of the polymer produced, so that run lives of at least one hundred hours are easily achieved at economically attractive production rates. For example, at an overall reactor productivity of 700 lb/hr. – 1000 gallon, coagulum ranges from only 0.004–0.008% of polymer produced in 100 hours, and at an overall reactor productivity of 1000 lbs/hr. – 1000 gallon coagulum ranges from 0.005–0.12% by weight of polymer. These rates of adhesion growth are low enough that run lives of 200–300 hours and greater should be attainable.

After formation of the polymer latex by the emulsion technique of removal of unreacted monomer is undertaken, e.g., by contacting the latex with steam at reduced pressure, since, e.g., 10 to 20% by weight of the acrylonitrile fed to the second reactor remains in monomer form. Thereafter, coagulation of the latex is carried out resulting in filterable particles of polymer by well-known techniques such as heating with steam, addition of salts of multivalent metals, or freezing and thawing. Desirably a pH of 6.0 to 7.5 is employed to minimize yellowness. Illustratively, salts of multivalent metals include use of acetates, chlorides and sulfates of either magnesium or aluminum.

After coagulation it is conventional to filter, wash, and dry the coagulated polymer. Subsequently, formation by melt processing operations takes place wherein conventional techniques involving heat and mechanical means to shape the polymer compositions are employed. Illustrative of melt processing operations are extrusion, blow molding, injection molding, injection blow molding, etc.

Additives may be added to the composition such as, for example, stabilizers including antioxidants as well as pigments and dyes. The additives are conventional to the art and may be incorporated by well-known methods such as mixing after coagulation and drying but prior to melt processing. Alternatively, blending of additives may take place at a later time such as dry blending after the shaping of the coagulated polymer into pellets followed by reshaping such as by extrusion.

For the final usage of the fabricated article, the exact makeup of the polymer composition will be dependent upon the properties desired, e.g., toughness or permeability. Illustratively, a rubber graft may be used to improve toughness in accordance with the teachings of Howe U.S. Pat. No. 3,819,762.

To further illustrate innovative aspects of the present invention, the following examples are provided. Unless otherwise specified all percentages and all ratios are on a weight basis. In the examples melt flow was determined as described in ASTM D-1238 with the following provisions: load – 5060 g., die – 0.082 inch diameter, and temperature – 220°C.

EXAMPLE 1

Continuous emulsion polymerization was carried out in two glass reactors connected in series. The first had a net volume of 2200 ml, the second 11,000 ml. Both were water jacketed and had turbine-type agitators mounted off-center. Both were run at 65°C. and were blanketed with nitrogen.

The feed to the first reactor consisted of 1.2–1.8 cc/min of a solution of 3 g. potassium persulfate in 1 liter of water, 10.1 cc/min. of acrylonitrile, 1.7 cc/min. of a solution of 29 g. of dodecylmercaptan in 1 liter styrene, and 20.6 cc/min. of a solution of 1.22% of Gafac RS 410* emulsifier in water. The pH of the latter solution was raised to 5.9–6.1 with $NH_4OH$, and oxygen was removed by sparging with nitrogen. The average residence time in the reactor was 66 min.

*tridecyl-omega-hydroxypoly(oxyethylene) mixture of dihydrogen and monohydrogen phosphate esters with acid number at pH 5.2 of 95-115 - General Aniline and Film Co.

With the exception of the persulfate initiator solution, the feed streams all entered a preemulsifier consisting of a 250 ml. creased flask with a high-speed stirring disc ("Vac-U-Stir" system) in which the monomers and mercaptan were emulsified before overflowing to the reactor. The initiator stream was added to the emulsified feed just at the inlet of the reactor through a small diameter plastic tube entering the glass tube conducting the emulsified feed from the preemulsifier to the reactor.

At intervals of two hours the reactor contents were sampled and analyzed for unreacted styrene and acrylonitrile by a gas chromatography technique. From the decrease in concentrations of the monomers relative to the concentrations in the feed the quantity and composition of polymer produced were calculated.

Over a representative period of 22 hours, in the first reactor an average of 47% of the acrylonitrile was polymerized. The average production rate was 5.12 g/min. of polymer containing 74% acrylonitrile. The minimum and maximum acrylonitrile contents were 71.2% and 75.9% respectively.

Over the same time period the ratio of styrene/acrylonitrile monomer in the reactor averaged 0.0237 with a range of 0.0191 to 0.030, or −19.4% to +26.5%. The emulsifier concentration was 4.96% by weight based on polymer.

Emulsion displaced from the first reactor by incoming feed overflowed directly into the second reactor. New feed to this reactor consisted of 2.2 cc/min. of potassium persulfate initiator solution, 12.7 cc/min. of acrylonitrile, 4.3 cc/min. of a solution of 43 g. dodecyl mercaptan in 1 liter of styrene, and 22.6 cc/min. of a solution of 0.3% Gafac RS 410 in water. The pH of the latter solution was raised to 5.9–6.1 with NH$_4$OH, and oxygen was removed by sparging with nitrogen. The feed streams were pre-emulsified as was done for the first reactor.

The total flow to the second reactor was such that the average residence time was 145 minutes. Sampling, analysis, and calculation of polymer production rate and composition were carried out as for the first reactor taking in account unreacted monomer coming over from the first reactor.

An average of 71.3% of entering acrylonitrile was converted to polymer in the second reactor. The average rate was 14.3 g/min., making the total polymer 19.4 g/min. The solids content of the latex leaving the second reactor was 27% and the emulsifier content was 1.66% by weight based on polymer. The average acrylonitrile content of polymer made was 74.1%, with a range of 73.4 – 74.6%. Overall conversion of acrylonitrile was 77.2%.

The ratio of styrene/acrylonitrile in the reactor averaged 0.0197 with high and low values of 0.0248 and 0.016. Thus the total range of the ratio was 25.9 to −18.8.

The product latex leaving the second reactor was rapidly cooled, aerated and an inhibitor, methyl ether of hydroquinone (100 ppm based on polymer), was added. Unreacted monomer was removed by contact with steam in a concurrent turbannular steam stripper. A 200 ml. sample of the stripped latex was slowly poured into an agitated solution of 15 g MgSO$_4$·7H$_2$O in 700 ml distilled water. The initial temperature of the salt solution was 65°C. After addition of the latex the temperature of the resulting slurry was brought to 75°C. The slurry pH was adjusted to 6.7 by addition of sodium hydroxide solution. The slurry was filtered and the filter cake was washed with 1 liter of the distilled water. The filter cake was dried at 80°C. in a vacuum oven for 24 hours.

The polymer had an inherent viscosity of 0.63 and a melt flow of 2.0. For a blend with 10% grafted styrene-butadiene rubber the yellowness index was 33 (ASTM D-1925-79) on 0.08 inch samples molded at 230°C. The melt stability was greater than 20 minutes.

The operation was continued under similar conditions for a total of 101 hours after which the reactors were drained, flushed and disassembled. Polymer adhering to the walls and agitators was carefully scraped off, dried, and weighed. The first reactor contained 0.2 g., the second 8.7 g. of adhered polymer, for a total of 8.9 g. This corresponds to 0.0076% of the total polymer produced.

The ratio of polymer production in the second reactor to that in the first reactor was 2.76. The initiator comsumption in the first reactor was 736 ppm by weight based on polymer, and in the second reactor it was 463 ppm. Overall initiator consumption was 535 ppm based on polymer.

EXAMPLES 2 to 6

Additional continuous emulsion polymerization runs were made following the general operating procedures described in Example 1. The following Table summarizes the results obtained.

Table 1

| Example | Aqueous Feed pH | Reactor Volume, liter (1) | (2) | Solids Content % (1) | (2) | Polymer Composition % acrylonitrile ½ Overall | Production Rate lb/hr. — M gal. 1 | 2 | Overall | Percent Conversion of acrylonitrile* 1 | (2) | Overall initiator ppm based on polymer | Duration of run hours | Coagulum % based on polymer 1 | 2 | Overall |
|---|---|---|---|---|---|---|---|---|---|---|---|---|---|---|---|---|
| 2 | 6 | 2.2 | 11 | 16.5 | 26.3 | 79–80–79.7 | 1180 | 590 | 689 | (50) | (70) | 600 | 105 | .0095 | .0065 | .0075 |
| 3 | 6 | 2.2 | 11 | 16 | 24.6 | 75–78–77 | 1000 | 1000 | 1000 | (50) | (70) | 960 | 102 | 0. | 0.0149 | 0.0124 |
| 4 | 5–3 | 4.9 | 11 | 19 | 27 | 76–83–80.6 | 1100 | 830 | 914 | (50) | (70) | 960 | 82 | .0018 | .0065 | .0047 |
| 5 | 4.6 | 2.2 | 11 | 18 | 25 | 80–82–81.5 | 1250 | 870 | 932 | (50) | (70) | 800 | 98 | .0445 | .0036 | .0124 |
| 6 | 4 | 2.2 | 11 | 18 | 25 | 76–77.5–77.2 | 1050 | 980 | 990 | (50) | (70) | 650 | 104 | .018 | .0025 | .0054 |

(1) represents first reactor
(2) represents second reactor
M represents 1,000
*nominal values

EXAMPLES 7 to 17

Additional continuous emulsion polymerization runs were made following the operating procedures described in Example 1 and covering a range of production rates and aqueous feed pH. Table 2 summarizes the results obtained.

Table 2

| Example | Aqueous Feed pH | Reactor Volume liter (1)(2) | Solids Content % (1)(2) | Polymer Comp. % Acrylonitrile (1) (2) (overall) | Production Rate lb/hour — M gal. (1) (2) (Overall) | Initiator Use ppm BOP | DDM Use g/l (1) | Styrene (2) | Product DMP Content ppm |
|---|---|---|---|---|---|---|---|---|---|
| 7 | 3 | 4.9 11 | 21 28 | 78 83 80.9 | 1233 806 937.6 | 965 | 35 | 43 | 79 |
| 8 | 4 | 2.2 11 | 17 25 | 76 77 77 | 1056 982 994.3 | 664 | 32 | 43 | 75 |
| 9 | 4 | 2.2 11 | " " | 77 78 77.5 | 1083 1000 1013.8 | 642 | " | " | 100 |
| 11 | 5 | 2.2 11 | 18 28 | 77 74 75 | 1303 697 798.0 | 542 | 18 | 27 | 178 |
| 12 | 5 | 2.2 11 | 17 26 | 78 76 76.5 | 1205 570 675.8 | 431 | 32 | 43 | 160 |
| 13 | 6 | 2.2 11 | 16 26 | 73 73 73 | 1190 717 795.8 | 661 | 18 | 27 | 125 |

Table 2-continued

| Example | Aqueous Feed pH | Reactor Volume liter (1) (2) | | Solids Content % (1) (2) | | Polymer Comp. % Acrylonitrile (1) (2) (overall) | | | Production Rate lb/hour — M gal. (1) (2) (Overall) | | | Initiator Use ppm BOP | DDM Use g/l (1) | Styrene (2) | Product DMP Content ppm |
|---|---|---|---|---|---|---|---|---|---|---|---|---|---|---|---|
| 14 | 6 | 2.2 | 11 | 16 | 27 | 72 | 73 | 73 | 1140 | 640 | 723.3 | 470 | 23 | 34 | 164 |
| 15 | 6 | 2.2 | 11 | 15 | 27 | 74 | 74 | 74 | 1190 | 645 | 735.8 | 609 | 29 | 43 | 120 |
| 16 | 6 | 2.2 | 11 | 16 | 26 | 73 | 73 | 73 | 1170 | 703 | 780.8 | 574 | 29 | 43 | 173 |
| 17 | 7.45 | 2.2 | 11 | 16 | 26 | 76 | 77 | 77 | 1130 | 590 | 680.8 | 572 | 32 | 43 | 568 |

DDM represents n-dodecylmercaptan
DMP represents dodecylmercaptanpropionitrile
BOP represents based on polymer
(1) represents first reactor
(2) represents second reactor

EXAMPLE 18 (COMPARATIVE EXAMPLE — EFFECT OF FEED EMULSIFICATION ON MELT VISCOSITY)

Continuous emulsion polymerization was carried out in two glass reactors connected in series. The first had a net volume of 3600 ml., the second 11,000 ml. Both were water jacketed and had turbine-type agitators mounted off-center. Both were run at 65°C. and were blanketed with nitrogen.

The monomer and water feeds to each reactor passed through a pre-emulsifier, consisting of a 250-ml. creased flask with a high-speed stirring disc. The agitators were both driven at 2800 rpm to emulsify the organic components in the aqueous feed stream.

The initiator feed solutions were not fed through the pre-emulsifiers, but were added to the emulsified feeds just at the inlets of the reactors. The feed to the first reactor consisted of 0.85 cc/min. of a solution of 3.0 g. potassium persulfate in 1 liter water, 6.3 cc/min. of acrylonitrile, 1.35 cc/min. of a solution of 40 g. n-dodecylmercaptan in 1 liter of styrene, and 12.9 cc/min. of a solution of 1.94% Gafac RE-610 emulsifier in water. The pH of the latter solution was raised to 4.8–5.2 with NH$_4$OH, and oxygen was removed by sparging with nitrogen. The average residence time in this first reactor was 169 minutes.

At intervals of 2 hours the reactor contents were sampled and analyzed for unreacted styrene and acrylonitrile by a gas chromatography technique. From the decrease in concentrations of the monomers relative to the concentrations in the feed, the quantity and composition of polymer produced were calculated. The run was continued for 23 hours during which time 5.0 g/min. of polymer containing 78% acrylonitrile was produced. The minimum and maximum acrylonitrile contents were 77.1% and 78.4% respectively. The emulsifier concentration was 5.07% based on polymer.

Emulsion displaced from the first reactor by incoming feed overflowed directly into the second reactor. New feed to this reactor consisted of 3.85 cc/min. of initiator solution, 22.2 cc./min. of acrylonitrile, 4.55 cc/min of a solution of 40 g. n-dodecyl mercaptan in styrene, and 33.1 cc/min. of a solution of 0.325% Gafac RE-610* emulsifier in water. The pH of the latter solution was raised to 4.8–5.2 with NH$_4$OH, and oxygen was removed by sparging with nitrogen.

The residence time in the second reactor was 128 min. and the temperature was 65°C. The average production rate was 17.7 g/min. of polymer containing 78.5% acrylonitrile. Minimum and maximum acrylonitrile contents were 77.5 and 79.4%. The emulsifier content was 1.59% based on polymer.

The polymer produced had an inherent viscosity of 0.69. After blending in 3% of a grafted styrene-butadiene rubber the melt flow was 0.75. Overall initiator use was 621 ppm based on polymer.

EXAMPLE 19 (COMPARATIVE EXAMPLE — EFFECT OF FEED EMULSIFICATION ON MELT VISCOSITY)

The same operating conditions as for Example 18 were maintained, except that the speeds of the pre-emulsifier agitators were reduced to 778 and 700 rpm, respectively. At these low speeds the feeds were not emulsified.

This run was continued for 21 hours. In reactor one an average of 5.02 g/min. of polymer containing 78.2% acrylonitrile was produced. Minimum and maximum acrylonitrile contents were 77.5% and 78.2%, respectively. Emulsifier concentration was 5.05% based on polymer.

In reactor two an average of 18.0 g/min. of polymer containing 79% acrylonitrile was produced. Minimum and maximum acrylonitrile contents were 78.7 and 79.3% respectively. Emulsifier concentration was 1.57% based on polymer. Overall initiator use was 637 ppm based on polymer.

The polymer produced had an inherent viscosity of 0.87–0.95. After blending in 3% of a grafted styrene-butadiene rubber the melt flow was 0.21 or only 28% of the melt flow obtained in Example 18 with well emulsified feeds. Stated another way, the melt viscosity was 3.57 times as large when the feeds were not emulsified.

EXAMPLE 20 (COMPARATIVE EXAMPLE — EFFECT OF FEED EMULSIFICATION ON MELT VISCOSITY)

The same operating conditions as for Example 18 were restored by raising the pre-emulsifier speeds to 2800 rpm so that the feeds again were well emulsified. This run was continued for 23 hours.

In reactor one an average of 4.91 g/min. of polymer containing 77.6% acrylonitrile was produced. Minimum and maximum acrylonitrile contents were 76.9 and 78.2% respectively. Emulsifier concentration was 5.7% based on polymer.

In reactor two an average of 17.7 g/min. of polymer containing 78.5% acrylonitrile was produced. Minimum and maximum acrylonitrile contents were 78.2 and 79.2% respectively. Emulsifier concentration was 1.6% based on polymer. Overall initiator use was 690 rpm.

The polymer had an inherent viscosity of 0.70. After blending in 3% of grafted styrene butadiene rubber the melt flow was 0.72 or substantially the same as for Example 18.

EXAMPLE 21 (COMPARATIVE EXAMPLE — EFFECT OF FEED EMULSIFICATION ON MELT VISCOSITY)

The operating conditions of Example 20 were maintained, except that the total quantity of emulsifier was fed with the aqueous feed to the first reactor in accordance with the teaching of U.S. Pat. No. 3,547,857. The aqueous feed to the second reactor consisted of water alone, while the aqueous feed to the first reactor was a solution of 2.78% of Gafac RE-610 in water. This run was continued for 22 hours. In the first reactor an average of 4.97 g/min. of polymer containing 78.0% acrylonitrile was produced. Minimum and maximum acrylonitrile contents were 77.5 and 78.5% respectively. Emulsifier concentration was 7.48% based on polymer.

In the second reactor an average of 18.0 g/min. of polymer containing 78.8% acrylonitrile was produced. Minimum and maximum acrylonitrile contents were 77.9 and 79.4% respectively. Emulsifier concentration was 1.62% based on polymer. Overall initiator use was 715 ppm based on polymer.

The polymer produced had an inherent viscosity of 0.86. After blending in 3% of grafted styrene-butadiene rubber, the melt flow was 0.38, or only 51.7% of the average melt flow obtained in Examples 18 and 20. Stated another way the melt viscosity was 1.93 times as high as that obtained when some emulsifier was fed to the second reactor so that the feeds to both reactors were well emulsified.

EXAMPLES 22 TO 40

Additional continuous emulsion polymerization runs were made following the operating procedures described in Example 1 particularly for the purpose of demonstrating the effect of polymer production ratios upon initiator use. As in Example 1, the initiator was potassium persulfate. In Examples 26 and 27 respectively the chain transfer agent was tridecyl mercaptan and n-octylmercaptan.

Table 3

| Example | Aqueous Feed pH | Polymer Production 2:1 | Initiator Use, 1 | Initiator Use, 2 | ppm BOP Overall | Reactor Productivity 1 | Reactor Productivity 2 | Overall | Polymer Comp. % AN | Emulsifier Type (Gafac) | EOP, % (1) (2) | Residence Time (min) 1 | Residence Time (min) 2 |
|---|---|---|---|---|---|---|---|---|---|---|---|---|---|
| 22 | 6 | 2.27 | 654 | 597 | 614 | 1254 | 567 | 681 | 80.2 | RE-610 | 4.5/1.7 | 66 | 149 |
| 23 | 6 | 2.5 | 811 | 458 | 558 | 1177 | 588 | 687 | 79.3 | RE-610 | 4.92/1.78 | 65 | 148 |
| 24 | 6 | 2.79 | 736 | 463 | 535 | 1160 | 647 | 735 | 74.1 | RE-410 | 4.96/1.66 | 66 | 145 |
| 25 | 6 | 3.0 | 869 | 478 | 574 | 1170 | 703 | 781 | 72.5 | RE-410 | 4.94/1.63 | 64 | 128 |
| 26 | 4.6 | 3.68 | 223 | 750 | 637 | 1245 | 917 | 971 | 82.2 | RE-610 | 4.6/1.63 | 67 | 102 |
| 27 | 4.6 | 3.85 | 351 | 685 | 615 | 1204 | 932 | 940 | 82.1 | RE-610 | 4.81/1.62 | 67 | 102 |
| 28 | 4.6 | 4.5 | 400 | 900 | 809 | 910 | 815 | 831 | 79.0 | RE-610 | 5/2.1 | 55 | 117 |
| 29 | 5 | 5.32 | 351 | 1038 | 929 | 937 | 998 | 950 | 76.6 | RE-610 | 5.86/1.61 | 75 | 97 |
| 30 | 5 | 4.89 | 436 | 1053 | 948 | 1017 | 993 | 996 | 76.8 | RE-610 | 5.37/1.59 | 75 | 97 |
| 31 | 6 | 1.56 | 938 | 736 | 810 | 983 | 683 | 776 | 79.6 | RE-610 | 3.99/1.81 | 73 | 102 |
| 32 | 6 | 2.92 | 421 | 707 | 631 | 601 | 779 | 725 | 79.5 | RE-610 | 4.54/1.9 | 117 | 114 |
| 33 | 6 | 3.36 | 236 | 847 | 707 | 518 | 776 | 695 | 79.4 | RE-610 | 3.88/1.31 | 177 | 115 |
| 34 | 6 | 2.3 | 328 | 573 | 499 | 570 | 586 | 581 | 77.8 | RE-610 | 4.69/1.88 | 149 | 148 |
| 35 | 6 | 4.77 | 865 | 819 | 827 | 1664 | 694 | 771 | 79. | RE-610 | 4.98/2 | 46 | 134 |
| 36 | 6 | 5.31 | 859 | 906 | 897 | 1573 | 730 | 799 | 79.6 | RE-610 | 5.25/1.92 | 46 | 133 |
| 37 | 6 | 1.83 | 646 | 996 | 872 | 928 | 557 | 650 | 78.9 | RE-610 | 4.8/2.26 | 95 | 98 |
| 38 | 6 | 1.89 | 377 | 961 | 758 | 977 | 604 | 695 | 80.4 | RE-610 | 4.56/2.11 | 96 | 99 |
| 39 | 6 | 1.99 | 628 | 586 | 599 | 947 | 617 | 700 | 80.4 | RE-610 | 4.71/1.96 | 95 | 113 |
| 40 | 6 | 2.0 | 769 | 688 | 717 | 1061 | 694 | 784 | 78.8 | RE-610 | 5.0/2.07 | 80 | 97 |
| 41 | 3.8 | 2.36 | 281 | 781 | 631 | 1270 | 597 | 710 | 77.5 | RE-610 | 4.73/2.02 | 67 | 149 |
| 42 | 4 | 2.7 | 477 | 445 | 453 | 1265 | 687 | 784 | 74. | RE-610 | 4.58/1.59 | 66 | 134 |
| 43 | 4 | 2.84 | 433 | 466 | 458 | 1227 | 700 | 789 | 74.1 | RE-610 | 4.7/1.57 | 66 | 134 |
| 44 | 4 | 2.94 | 550 | 466 | 487 | 1192 | 702 | 783 | 74. | RE-610 | 4.84/1.58 | 66 | 134 |
| 45 | 4 | 2.9 | 507 | 430 | 448 | 1212 | 704 | 789 | 74.4 | RE-610 | 4.79/1.57 | 65 | 132 |
| 46 | 4 | 4.09 | 178 | 554 | 478 | 1152 | 942 | 980 | 76.8 | RE-610 | 4.86/1.98 | 77 | 98 |
| 47 | 4 | 4.64 | 207 | 762 | 664 | 1056 | 982 | 994 | 77.1 | RE-610 | 5.23/1.95 | 77 | 98 |
| 48 | 4 | 4.7 | 207 | 745 | 650 | 1049 | 987 | 999 | 77.2 | RE-610 | 5.33/1.94 | 77 | 98 |

1 represents first reactor
2 represents second reactor
EOP represents emulsifier level based on polymer
AN represents acrylonitrile

What is claimed is:
1. A method of polymerization comprising
 a. into a first reactor continuously feeding a free radical initiator and aqueous emulsified chain transfer agent, acrylonitrile and at least one monomer of styrene; 4-methyl styrene; 4-(t-butyl)styrene; 3-methyl styrene; 2,4-dimethyl styrene; 2,6-dimethyl styrene and 2,4-diisopropyl styrene or alpha-methyl styrene in combination with one of the above monomers; whereby at least 95% of the reaction time the monomer content relative to acrylonitrile in the reactor is maintained within 25% of a ratio required to be maintained to produce a polymer with an average composition of 65% to 85% by weight polymerized units of acrylonitrile and 35 to 15% by weight polymerized units of said monomer, said first reactor having a reaction temperature between 50 to 75°C.,
 b. from said first reactor continuously withdrawing an outlet stream containing a polymer solids content of 15 to 20% by weight, an emulsifier content of 4 to 7% by weight of polymer, and unreacted acrylonitrile of 45 to 60% by weight of acrylonitrile feed to the first reactor;
 c. into a second reactor continuously feeding the outlet stream from step (b) together with free radical initiator and added aqueous emulsified chain transfer agent, acrylonitrile and said monomer with emulsifier present in an amount of at least 0.2% by weight of added water exclusive of water from step (b) whereby at least 95% of the reaction time a monomer content relative to acrylonitrile is maintained in the second reactor within 25% of a ratio required to be maintained to produce a polymer with an average composition of 65% to 85% by weight polymerized units of acrylonitrile and 35 to 15% polymerized units of said monomer, said second reactor having a reaction temperature between 50° to 75°C.;

d. from said second reactor continuously withdrawing an outlet stream containing a polymer solids content of 20 to 30% by weight, an emulsifier content of 1.3 to 2.5% by weight of polymer, and unreacted acrylonitrile of 10 to 30% by weight of acrylonitrile feed to the second reactor, a ratio of polymer production in the second reactor to the first reactor maintained in a range of 1:1 to 6:1; the polymer possessing a melt stability of at least 10 minutes, an inherent viscosity of 0.3 to 1.0 deciliter/g as measured on a 0.5 g/deciliter solution of the polymer in gammabutyrolactone at 35°C., a melt viscosity of $10^4$ to $10^6$ poises at 220°C. and a carbon dioxide permeability of less than 0.045 barrer and containing 65 to 85% by weight polymerized units of acrylonitrile and 35 to 15% by weight polymerized units of said monomer.

2. The method of claim 1 wherein in step (b) the polymer solids content is 16 to 19% by weight, the emulsifier level is 5 to 6% by weight and unreacted acrylonitrile is 50 to 55% by weight.

3. The method of claim 1 wherein in step (d) the polymer solids content is 23 to 27% by weight, the emulsifier content is 1.6 to 2.2% by weight and unreacted acrylonitrile is 15 to 25% by weight.

4. The method of claim 2 wherein in step (d) the polymer solids content is 23 to 27% by weight, the emulsifier content is 1.6 to 2.2% by weight and unreacted acrylonitrile is 15 to 25% by weight.

5. The method of claim 1 wherein the ratio of polymer production in the second reactor to the first reactor is in the range of 2:1 to 5:1.

6. The method of claim 4 wherein the ratio of polymer production in the second reactor to the first reactor is in the range of 2:1 to 5:1.

7. The method of claim 1 wherein said polymer from step (d) contains 73 to 82% by weight polymerized units of acrylonitrile and 27 to 18% by weight polymerized units of said monomer.

8. The method of claim 7 wherein said polymer contains 25 to 15% by weight polymerized units of styrene.

9. The method of claim 1 wherein a pH in the range of 3 to 8 is maintained in the aqueous feed of step (a) and step (c), excluding the outlet stream from step (b).

10. The method of claim 6 wherein a pH in the range of 3 to 8 is maintained in the aqueous feed of step (a) and step (c), excluding the outlet stream from step (b).

11. The method of claim 10 wherein the pH is 4 to 6.

12. The method of claim 1 wherein said chain transfer agent is a primary or secondary alkyl mercaptan wherein the carbon atoms in the alkyl chain total 10 to 13 carbon atoms.

13. The method of claim 11 wherein said chain transfer agent is n-dodecyl mercaptan or tridecyl mercaptan.

14. The method of claim 13 wherein said chain transfer agent is n-dodecyl mercaptan with a feed concentrate of 0.16% to 0.74% by weight based on monomers to the first reactor and a feed concentration of 0.35% to 1.6% by weight based on acrylonitrile and said monomer to the second reactor to obtain the polymer from step (d) containing less than 250 ppm of dodecylmercaptopropionitrile adduct.

15. The method of claim 1 wherein the ratios in step (a) and step (c) are maintained throughout the polymerization.

16. The method of claim 1 wherein an average residence time in the first reactor is between 55 to 150 minutes.

17. The method of claim 16 wherein the average residence time in the second reactor is between 90 to 150 minutes.

18. The method of claim 14 wherein an average residence time in the first reactor is between 55 to 150 minutes and an average residence time in the second reactor is between 90 to 150 minutes at a temperature of 50° to 75°C.

19. The method of claim 1 wherein said emulsifier is an aryl- or alkyl-poly (oxyethylene) ester of phosphoric acid.

20. The method of claim 18 wherein said emulsifier is an aryl- or alkyl-poly (oxyethylene) ester of phosphoric acid.

21. The method of claim 1 wherein said initiator is an inorganic persulfate.

22. The method of claim 20 wherein said initiator is an inorganic persulfate.

23. The method of claim 22 wherein said inorganic persulfate is fed in steps (a) and (c) in an amount not more than 600 ppm based on polymer obtained from step (d).

24. The method of claim 1 wherein coagulum formation in the first and second reactors totals not more than 0.12% by weight of polymer obtained in step (d).

25. The method of claim 23 wherein coagulum formation in the first and second reactors totals not more than 0.12% by weight of polymer obtained in step (d).

26. The method of claim 25 wherein the polymer obtained from step (d) is produced at a rate of 1,000 pounds/hours — 1,000 gallons of total reaction volume for a 100 hours period.

27. The method of claim 1 wherein the polymer obtained from step (d) has a yellowness index less than 40.

28. The method of claim 26 wherein the polymer obtained from step (d) has a yellowness index less than 40.

29. The method of claim 1 wherein the reaction temperature in both the first and second reactor is between 65° to 70°C.

* * * * *